June 9, 1964 J. O. HAMBY ETAL 3,136,952

AUTOMATIC SIGNAL DETECTOR

Filed Nov. 21, 1960 2 Sheets-Sheet 1

WITNESSES

Leon J. Taga

John E. Healy, Jr.

INVENTORS

Jefferson O. Hamby and

Emil L. Svensson

BY M. J. Brodahl

ATTORNEY

United States Patent Office 3,136,952

Patented June 9, 1964

3,136,952

AUTOMATIC SIGNAL DETECTOR

Jefferson O. Hamby, Baltimore, and Emil L. Svensson, Glen Burnie, Md., assignors to Westinghouse Electric Corporation, East Pittsburgh, Pa., a corporation of Pennsylvania Filed Nov. 21, 1960, Ser. No. 70,575
6 Claims. (Cl. 328—140)

The present invention relates in general to automatic signal detecting apparatus and more particularly to improved signal detecting apparatus in which a substantially constant amplitude signal from an automatic gain controlled receiver or the like is to be detected in the presence of noise wherein the signal-to-noise ratio is small.

For numerous purposes it may be desired to actuate an alarm or sensing device when a particular signal is received. The received signal desired to be detected may be of a continuous wave or pulsed energy form of a known frequency. The signal may be obtained for example from an automatic gain controlled receiver regulated at a predetermined noise level. Known prior art systems for attempting to do this may employ an amplitude integrating device which must be set, in a practical system, at a threshold signal level considerably above a unity signal-to-noise ratio to insure that no undesired false actuating signals are received due to noise level changes. When the output of the receiver is automatic gain controlled and the output voltage and power remains substantially constant, the problem arises of detecting a low level signal in the presence of noise.

It is therefore an object of this invention to provide an improved automatic signal detecting system to detect a desired signal and then supply an actuating control signal even if the input signal has a low signal-to-noise ratio.

It is a further object to provide an improved automatic signal detection system which will supply an activating control signal only when a desired input signal is present, and which system will not be actuated due to random noise signals.

It is a further and more specific object to provide an improved signal detection system comprising a plurality of bistable devices which are brought into synchronism when supplied with an input signal desired to be detected and which provides an actuating control signal even when this input signal has a low signal-to-noise ratio.

Further objects and improvements will become apparent from the following description and drawings, in which.

Figure 1:
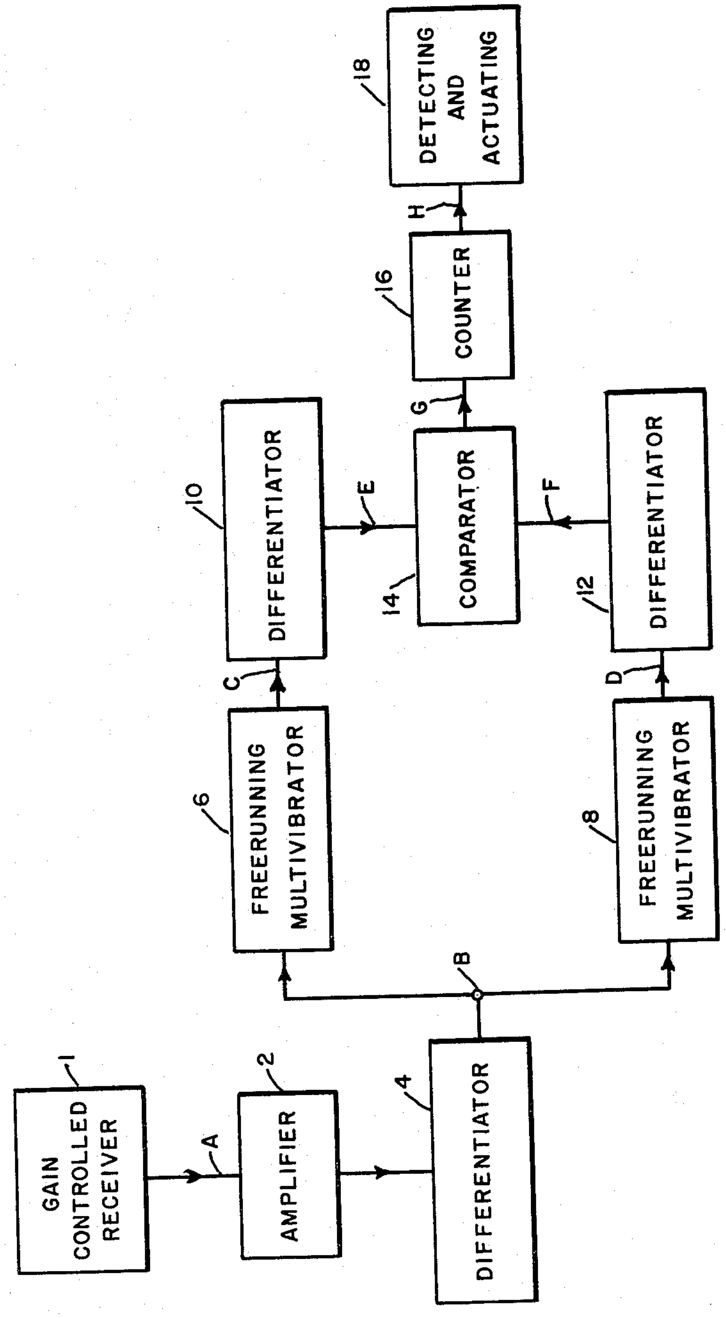
FIGURE 1 is a block diagram of the present automatic signal detecting system.

Considering FIG. 1, the output signal from a receiver 1, such as a gain controlled continuous wave signal in the presence of noise, is applied to amplifier 2, in which this output signal is amplified and clipped. The amplified and clipped signal is then applied to differentiator 4 where it is differentiated. The differentiated output signal is then applied as trigger pulses simultaneously to two free-running multivibrators 6 and 8. Multivibrators 6 and 8 are so designed that they can be triggered from one state to the other only during a predetermined one half cycle of their operation. For purposes of explanation, the multivibrators will be able to change states only during the "shaded" part of the cycle, as shown in curves C and D of FIGS. 2 and 3. The pulsed outputs of multivibrators 6 and 8 are applied to differentiators 10 and 12, respectively, where the signals are differentiated and applied to separate inputs of comparator 14. Upon time coincidence of inputs applied to comparator 14 from differentiators 10 and 12, comparator 14 will supply an output to counter 16. If a particular predetermined number of pulses are received by counter 16 within a given time, the counter will provide an output signal to detecting and actuating circuit 18, which will give an indication of the desired input signal from the receiver 1.

To explain the operation of the system, it will first be considered from the two limiting conditions (1) with only noise present at the input, and (2) with only the desired signal input present.

Figure 3:
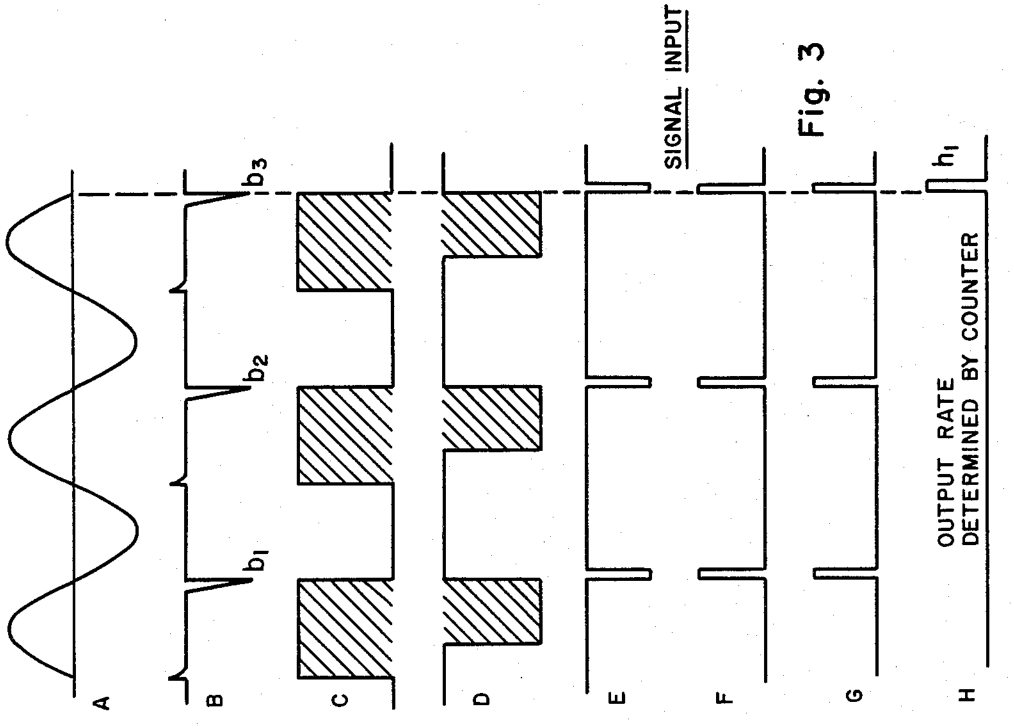
FIG. 3 is a waveform diagram illustrating the operation thereof at various designated points in the system with only a desired signal present at the input.
Figure 2:
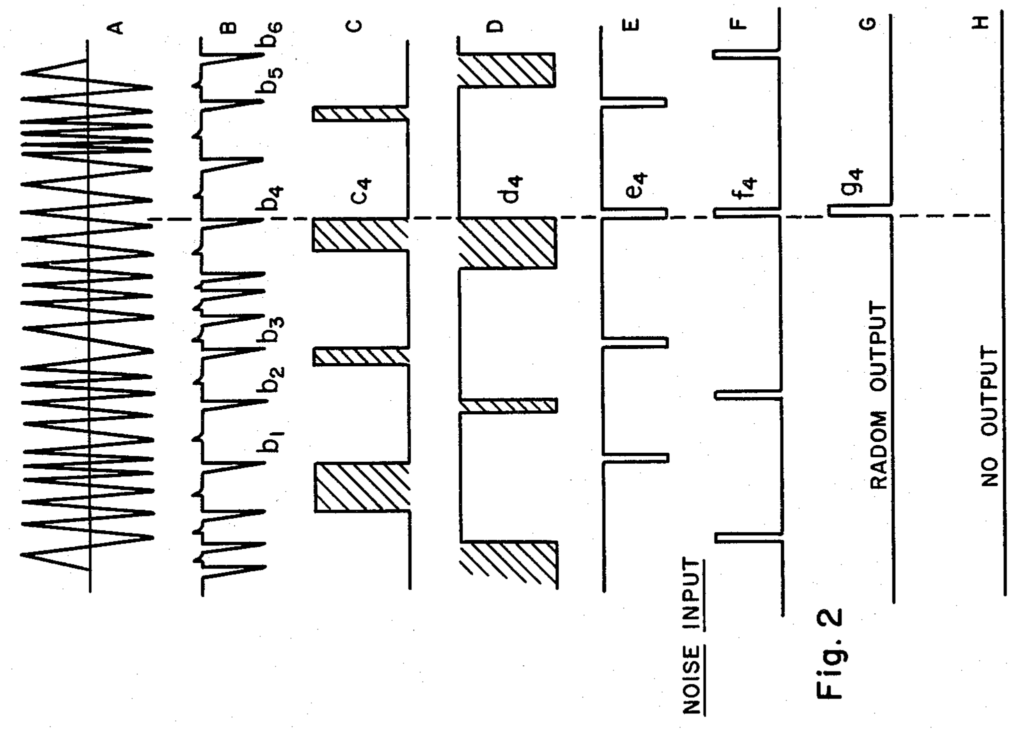
FIG. 2 is a waveform diagram illustrating the operation thereof at various designated points in the system with only noise present at the input.

The waveforms for the noise input case are shown in FIG. 2. With the random noise amplitude controlled input (curve A in FIG. 2), differentiator 4 provides a more or less random distribution of trigger pulses ($b_1$, $b_2$, $b_3$, etc. of curve B shown in FIG. 2). These pulses are unidirectional, with the other polarity being clipped in the differentiator circuit 4. The trigger pulses are simultaneously applied to multivibrators 6 and 8. Multivibrators 6 and 8 in the free-running state are designed to have slightly different pulse repetition rates (e.g., 810 c.p.s. and 830 c.p.s., respectively). As shown in FIGS. 2 and 3 at curves C and D, multivibrator 6 has a higher pulse repetition rate than does multivibrator 8. Thus, the multivibrators will not stay in synchronism, but will constantly be going in and out of synchronism unless triggered in a particular manner. As was previously brought out, the multivibrators will change state only when triggered in the "shaded" part of the cycle.

Referring to FIG. 2B, it is seen that the only time in the above given example both multivibrators are in the "shaded" state and a trigger pulse is available to change the state is when the pulse $b_4$ is provided by differentiator 4. At this time, the "shaded" pulses $c_4$ and $d_4$ simultaneously change to the "unshaded" state as shown in curves C and D. The output pulses $c_4$ and $d_4$ of multivibrators 6 and 8 are differentiated to give pulses $e_4$ and $f_4$, respectively. As $e_4$ and $f_4$ of FIG. 2 are in time coincidence, they are applied simultaneously to comparator 14, which in turn supplies a pulse $g_4$ to counter 16. However, it should be noted, that the various other trigger pulses $b_1$, $b_2$, $b_3$, $b_5$, etc. randomly occurring, depending on the noise function, do not trigger the multivibrators simultaneously, as the multivibrators have different free-running pulse repetition rates and can only be triggered in a particular state. Thus, any coincidental inputs to comparator 14 to provide an output to the counter (shown by curve G) will occur randomly. Counter 16 must receive a predetermined number of pulses within a given time period in order to supply an output pulse to detecting and actuating circuit 18. In this case, the output signal shown by curve G, occurring only at the random time coincidence of triggering of the multivibrators, will not provide the necessary number of pulses with only a noise input to permit counter 16 to supply a signal to actuating and detecting circuit 18.

Considering the desired signal input case shown in FIG. 3, it is seen that one triggering pulse ($b_1$, $b_2$, $b_3$, etc.) is provided for each cycle of the CW wave (A). Thus, with this signal input, multivibrators 6 and 8 will quickly come into synchronism (shown at C and D), because of the different pulse repetition rates (the frequency of the multivibrators being less than the signal frequency), and will then be locked in synchronism by the repetitively occurring trigger pulses ($b_1$, $b_2$, $b_3$, etc.). The now synchronized multivibrators 6 and 8 will provide output signals E and F, which will appear simultaneously at the inputs to comparator 14. Comparator 14 provides an output G of one pulse for each input signal cycle.

Counter 16 will provide an actuating pulse if a particular number of pulses are received, e.g., three pulses within three cycles of the input frequency, as shown at H.

Considering now normal system operation with both noise and signal inputs present, if the output from the receiver supplying the input signals to amplifier 2 is gain controlled, as the desired signal appears the amplitude of the noise is decreased. Since the noise is amplified and clipped, any signal present (even though the same input level is maintained) will cause the amplifier to saturate and allow the signal to pass through to provide synchronized trigger pulses to the multivibrators. The operation is then the same as in the desired signal input case above described.

The counter 16 has a predetermined threshold that will provide an output if a signal from the receiver has a low signal-to-noise ratio, but will not provide an output if only noise is present.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

We claim as our invention:

1. A signal detector system comprising means for receiving and differentiating signals, a pair of free running multivibrators each operatively connected to said differentiating means, means responsive to simultaneous output signals from said multivibrators to provide an output signal, means responsive to the output signal of said last named means for providing a second output signal for each group of a predetermined number of received signals occurring within a predetermined time interval.

2. A signal detector system comprising signal receiving means, means connected to said receiving means for differentiating signals received by said receiving means, a pair of free running multivibrators each operatively connected to said differentiating means, said multivibrators being triggered in synchronism in response to output signals from said differentiating means, means responsive to simultaneous signals from said multivibrators to provide a second output signal, integrating means operatively associated with said last named means for providing a third output signal in response to the integration of a predetermined number of said second output signals.

3. A signal detector system comprising means for receiving signals, differentiating means connected to said receiver for providing first output signals in response to the differentiation of received signals, a pair of free running multivibrators each operatively connected to said differentiating means and having different natural operating frequencies, said multivibrators being triggered in synchronism in response to said first output signals, means responsive to simultaneous output signals from said multivibrators to provide second output signals and means responsive to said last named means for providing third output signals in response to a predetermined number of said second output signals occurring within a predetermined time interval.

4. A signal detector system comprising means for receiving signals, means connected to said receiving means for differentiating received signals, a pair of free running multivibrators having different free running pulse repetition frequencies, said multivibrators capable of being triggered from one conducting state to another only in one particular state, the input of said multivibrators being connected to the output of said differentiating means, said multivibrators being triggered in synchronism in response to first output signals from said differentiating means, means responsive to simultaneous signals from said multivibrators to provide second output signals and means responsive to a predetermined number of said second output signals for providing third output signals in response to a predetermined number of said second output signals within a predetermined time interval.

5. A signal detector system comprising receiving means for receiving desired signals of a known frequency, differentiating means connected to said receiver for differentiating said desired signals, a pair of free running multivibrators each operatively connected to said differentiating means and having different natural operating frequencies each lower than the frequency of the signals to be detected, said multivibrators capable of being triggered from one conducting state to another only in one particular state, said multivibrators being triggered in synchronism in response to first output signals from said differentiating means, signal comparator means being connected to the outputs of said multivibrators and being responsive to simultaneous signals from said multivibrators to provide second output signals, counting means responsive to said comparator means for providing third output signals in response to a predetetrmined number of output signals from said comparator means within a predetermined time interval.

6. A signal detector system comprising automatic gain control receiver means for providing a source of signals of a predeterimned threshold level, differentiating means connected to said receiver for differentiating received signals of a known frequency, a pair of free running multivibrators each operatively connected to said differentiating means, said multivibrators having different natural operating frequencies lower than the frequency of the signals to be received and being triggered in synchronism in response to output signals from said differentiating means, means responsive to simultaneous signals from said multivibrators to provide second output signals, and means for integrating a predetermined number of output signals from said last named means for providing third output signals.

References Cited in the file of this patent

UNITED STATES PATENTS

| | | |
|---|---|---|
| 2,716,189 | Ayres | Aug. 23, 1955 |
| 2,881,311 | Tykulsky | Apr. 7, 1959 |
| 2,917,716 | Mura et al. | Dec. 15, 1959 |